C. JACOBS.
Evaporating Pan.
No. 32,998. Patented Aug. 6, 1861.
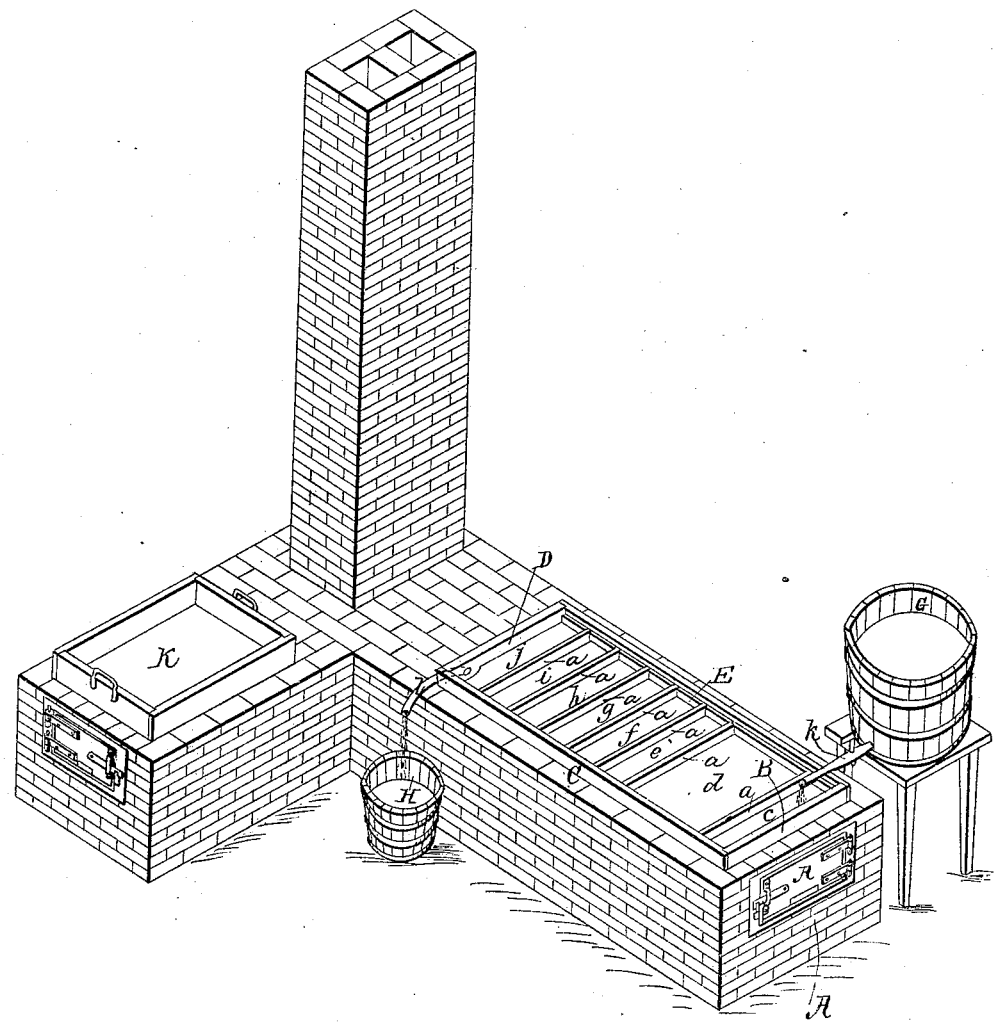
Witnesses.
John J. Blain
John L. Gill
Inventor.
Cornelius Jacobs

UNITED STATES PATENT OFFICE.

CORNELIUS JACOBS, OF COLUMBUS, OHIO.

IMPROVEMENT IN PANS FOR EVAPORATING AND CLARIFYING SACCHARINE JUICES.

Specification forming part of Letters Patent No. 32,998, dated August 6, 1861.

*To all whom it may concern:*

Be it known that I, CORNELIUS JACOBS, of Columbus, in the county of Franklin and State of Ohio, have invented a new and useful Improvement in Evaporating and Clarifying Pans; and I do hereby declare that the following is a full, clear, and exact description of the same, reference being had to the accompanying drawing, forming part of this specification.

The drawing represents a perspective view of my improved pan arranged for use on a furnace. My pan is especially designed for clarifying and condensing the expressed juices of *Sorghum saccharatum* and other kindred plants, for the purpose of preparing the same to be granulated into sugar, or for the manufacture of molasses therefrom.

The nature of my invention consists in having the partitions or division-strips of the pan rest directly down upon the bottom of the pan in such manner that, notwithstanding the flowing of the juice in a thin equal sheet from one division to another will not be interfered with, hydrostatic pressure and capillary attraction insuring such result, the passage of impurities along with the juice is effectually prevented.

It consists, second, in tapering or rounding off the lower edges of the division-strips or partitions so that a very small amount of surface shall come in contact with the bottom of the pan, and thus scorching of the juice by delay in its passage under the strips prevented.

It consists, third, in the combination of an adjustable bent pipe with the said evaporating-pan, as hereinafter described.

To enable others skilled in the art to make and use my invention, I will proceed to describe its construction and operation.

In practice the pan B C D E is arranged on a brick, stone, or metal furnace, A, in the manner shown. The pan is of rectangular form and quite shallow, and may be made wholly of metal or with a bevel metallic bottom and wooden sides and ends. It is divided into chambers by means of transverse partitions *a a a a*, passing from one side of the pan to the other, and fitting loosely in grooves, so as to be readily removed. These partitions rest directly upon the bottom of the pan, but do not form a water-tight joint, as they depend wholly upon their gravity to keep themselves in contact with the pan. By thus resting upon the bottom of the pan the juice in passing under them is distributed in a regular sheet over the whole bottom of the pan, and thus an equal and regular flow is maintained, and while this is so the free intermixture of the juices in the divisions is prevented, and therefore an arrest of the impurities rising upon the surface of the juice is effected in each of the respective divisions, and skimming can be performed in either of the divisions without disturbing the juice in the adjoining divisions. The lower edge of the division-strips or partitions is tapered down or rounded off, so that only a small amount of surface shall come in contact with the bottom of the pan, and thus lessen the danger of the juice scorching directly under the strips. The several divisions formed by the partitions are marked, respectively, $c$, $d$, $e$, $f$, $g$, $h$, $i$, and $j$. They should be made of equal capacity, excepting $d$, so that one skimmer of given size will answer for all, and when brought into operation will remove the whole scum in each respective division at once. As the division $d$ is subjected to the most direct action of the fire, and in it the greatest quantity of scum rises upon the surface of the juice, it should be about three times the size of the other divisions.

The sides and ends of the pan rest on the walls of the furnace horizontally on both horizontal and transverse lines, in order that an extensive shallow condition of the juice in the pan may be maintained.

A receiving-vessel, G, for the expressed juices supplies the pan, through a regulating-cock, $k$, with the requisite quantity of juice, and the clarified juices escape into a vessel, H, through a bent tube, $l$, at the last end of the pan. The fixed end of the pipe $l$ where it joins or enters the pan is round, and connected so as to turn when force is applied to the pipe. The loose end of this pipe may be turned up or down, so as to correspond with the quantity of juice it is desired to have in the pan during the clarifying and evaporating process. By means of this pipe the depth of the juice in the pan may be perfectly regulated—that is, any desirable depth may be maintained by raising the discharge end of the pipe, or the most practicable shallowness resorted to by lowering said end of the pipe.

Care sufficient to prevent the bottom of the pan from getting dry or uncovered, and the juice consequently being scorched, is all that is necessary in operating with the pipe $l$. This pipe is a very important improvement in shallow evaporating-pans, as it admits of juice being cooked at an average depth of one-sixteenth of an inch or less with safety, and thus much time and labor will be saved, for if the time of exposure of the juice to boiling heat increases in proportion as the depth of the juice in the pan is increased, the time required for a shallow sheet to be clarified and evaporated will not be as long as for a deep sheet. The flow of the juice over the level bottom of the pan from the division $c$ to the conducting-pipe $l$ is effected by the fluid gravity and capillary attraction, which cause it to flow under the partitions notwithstanding that the partitions rest directly upon the bottom of the pan and have no other vertical support except that resulting from friction between the partitions and the sides of the grooves, which confine them laterally and longitudinally. This direct contact of the partitions with the bottom of the pans is another important improvement in evaporators, as it insures a regular and uniform flow on the whole surface of the pan both laterally and longitudinally, and also presents a commingling of the juices in the several divisions before the impurities, which should be left in the respective divisions, have been arrested and skimmed off. The supply of the juice to division $c$ of the pan is to be so regulated by the cock $k$ as to compensate for the quantity that is exhausted by evaporation and skimming and the discharge of the clarified sirup through the conductor $l$ will require. The juice in division $c$ will be heated to nearly boiling-point before it enters $d$. In entering division $d$ it will instantly boil and throw up the greatest quantity of scum in said division. It will then be gradually clarified and condensed in the other divisions until it arrives in division $j$, from which a clear sirup is discharged through conductor $l$ into receiver H.

In beginning the operation with this pan, water may be put in sufficient to cover its bottom. When the water begins to boil, the cock $k$ is opened and juice supplied, as described.

The sirup in passing through this pan, as described, may be reduced to any degree of density required; but after the clarifying is perfected I use a deeper pan, K, for further rapid evaporation and condensation on account of the inclination of the sirup to rise when it has become quite dense.

I do not claim evaporating sugar-juices in a pan which has divisions constructed and so as to form a zigzag passage for the juice; nor do I claim a pan with partitions which have gates or passages cut in them at certain points for the flow of the juice, neither do I claim a pan which has its partitions held in relief or suspended above the bottom of the pan; but What I do claim as my invention, and desire to secure by Letters Patent, is—

1. The specified arrangement of the division-strips $a\ a$, for the purpose set forth.

2. The specified construction of the lower edge of the strips $a\ a$, for the purpose set forth.

3. The specified combination and arrangement of the adjustable-bent pipe $l$, and shallow evaporating-pan with division-strips $a\ a$, which are tapered at their lower edge, all in the manner and for the purpose herein described.

CORNELIUS JACOBS.

In presence of—
H. J. PAGE,
RICHARD PAGE.